US012695826B1

(12) United States Patent
Studesville

(10) Patent No.: US 12,695,826 B1
(45) Date of Patent: Jul. 28, 2026

(54) VOICE AMPLIFIER THAT AMPLIFIES A HUMAN VOICE FROM A MICROPHONE THROUGH A MOBILE DEVICE AND INTERNAL SPEAKER

(71) Applicant: Marold Owen Studesville, Palmdale, CA (US)

(72) Inventor: Marold Owen Studesville, Palmdale, CA (US)

( * ) Notice: Subject to any disclaimer, the term of this patent is extended or adjusted under 35 U.S.C. 154(b) by 677 days.

(21) Appl. No.: 18/101,130

(22) Filed: Jan. 25, 2023

(51) Int. Cl.
| | |
|---|---|
| H04M 1/60 | (2006.01) |
| H04M 1/03 | (2006.01) |
| H04M 1/72409 | (2021.01) |
| H04M 1/72448 | (2021.01) |
| H04R 1/02 | (2006.01) |
| H04R 1/08 | (2006.01) |

(52) U.S. Cl.
CPC .............. *H04M 1/60* (2013.01); *H04M 1/03* (2013.01); *H04M 1/72409* (2021.01); *H04M 1/72448* (2021.01); *H04R 1/025* (2013.01); *H04R 1/08* (2013.01); *H04R 2420/07* (2013.01)

(58) Field of Classification Search
CPC ...... H04M 1/60; H04M 1/03; H04M 1/72409; H04M 1/72448; H04R 1/025; H04R 1/08; H04R 2420/07
See application file for complete search history.

(56) References Cited

U.S. PATENT DOCUMENTS

| | | | | |
|---|---|---|---|---|
| 12,283,265 | B1 * | 4/2025 | Sumberg ................ | G10K 15/02 |
| 2009/0165634 | A1 * | 7/2009 | Mahowald ............. | G10H 1/368 |
| | | | | 84/610 |
| 2011/0082698 | A1 * | 4/2011 | Rosenthal .............. | G09B 19/00 |
| | | | | 704/270.1 |
| 2015/0293650 | A1 * | 10/2015 | Dukhovny ............ | G06F 40/177 |
| | | | | 715/732 |
| 2019/0080708 | A1 * | 3/2019 | Mohan ..................... | G10L 15/22 |
| 2021/0258414 | A1 * | 8/2021 | Nesterenko .......... | H04R 1/1041 |
| 2022/0103200 | A1 * | 3/2022 | Justiss .................... | H04B 1/385 |
| 2023/0119303 | A1 * | 4/2023 | Matthews .............. | H04R 1/028 |
| | | | | 128/201.19 |
| 2025/0184643 | A1 * | 6/2025 | Riccio ..................... | H04R 1/08 |

* cited by examiner

*Primary Examiner* — Angelica Perez
(74) *Attorney, Agent, or Firm* — Plager Schack LLP; Mark H. Plager; Stephen Hallberg

(57) ABSTRACT

A voice amplifier that amplifies volume of a human voice from a microphone through a mobile device by utilizing a speaker that is communicably connected to the mobile device is disclosed. The voice amplifier is designed for a mobile device, such as a smart phone or a tablet computing device. The voice amplifier purely amplifies the voice from a wired or non-wired microphone through a phone operating system and hardware components and other modules of the mobile device, such as by utilizing the phone speaker and/or an optional wireless or wired speaker. Essentially through a voice amplifier mobile app, a voice can be amplified simply with the touch of one icon. The concept is for people wearing masks due to COVID-19 and future other viruses, and/or dusty, toxic, or otherwise unhealthy air environments where masks are needed, to continue to wear their mask but be able to communicate clearly.

15 Claims, 2 Drawing Sheets

VOICE AMPLIFIER THAT AMPLIFIES A HUMAN VOICE FROM A MICROPHONE THROUGH A MOBILE DEVICE AND INTERNAL SPEAKER

BACKGROUND

With the current COVID-19 pandemic, people are being required to wear masks in public places to try and restrict the transfer of the virus from one person to another. Because of the wearing of masks, people are unable to communicate effectively, due to lack of visual stimulus of the lips moving and other facial movements, and the mask causes everyone's voice to be severely muffled and difficult to understand. To be heard clearly and to be understood, people remove their masks when talking with others. Drive through options at restaurants and banks are a prime example where communication is already difficult. Add the additional safe distancing mandate, and we have a serious communication issue.

Existing options include an orator set up of a microphone with needed electronics and speaker, but this requires a lot of extra items that most people do not have readily available to make it work. Accordingly, users of this option (orator set up) would have to purchase and carry around such extraneous items with them daily just to communicate effectively with others while wearing a mask or face shield (or other obstructive item).

Therefore, what is needed is a way to amplify a user's voice in a universal and easily accessible way for most people without requiring additional specialized equipment.

BRIEF DESCRIPTION

A novel voice amplifier is disclosed that amplifies volume of a human voice from a microphone through a mobile device by utilizing a speaker that is communicably connected to the mobile device. In some embodiments, the voice amplifier is implemented as a mobile application (hereinafter "mobile app", "voice amplifier mobile app", or "SD2 Voice Amplifier mobile app") that runs on a smartphone to purely amplify a voice of a user from a wired or wireless microphone. In some embodiments, the voice amplifier amplifies the voice of the user from the microphone through the mobile device OS and then utilizes a speaker of the smartphone, a Bluetooth speaker, or a wired speaker to amplify the user's voice.

Also disclosed in this specification is a novel mobile device voice amplification method for amplifying volume of a voice of a human user of the voice amplifier mobile app. In some embodiments, the mobile device voice amplification method for amplifying volume of a voice is performed by the human user as the user is operating the mobile device and interacting with the voice amplifier mobile app.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
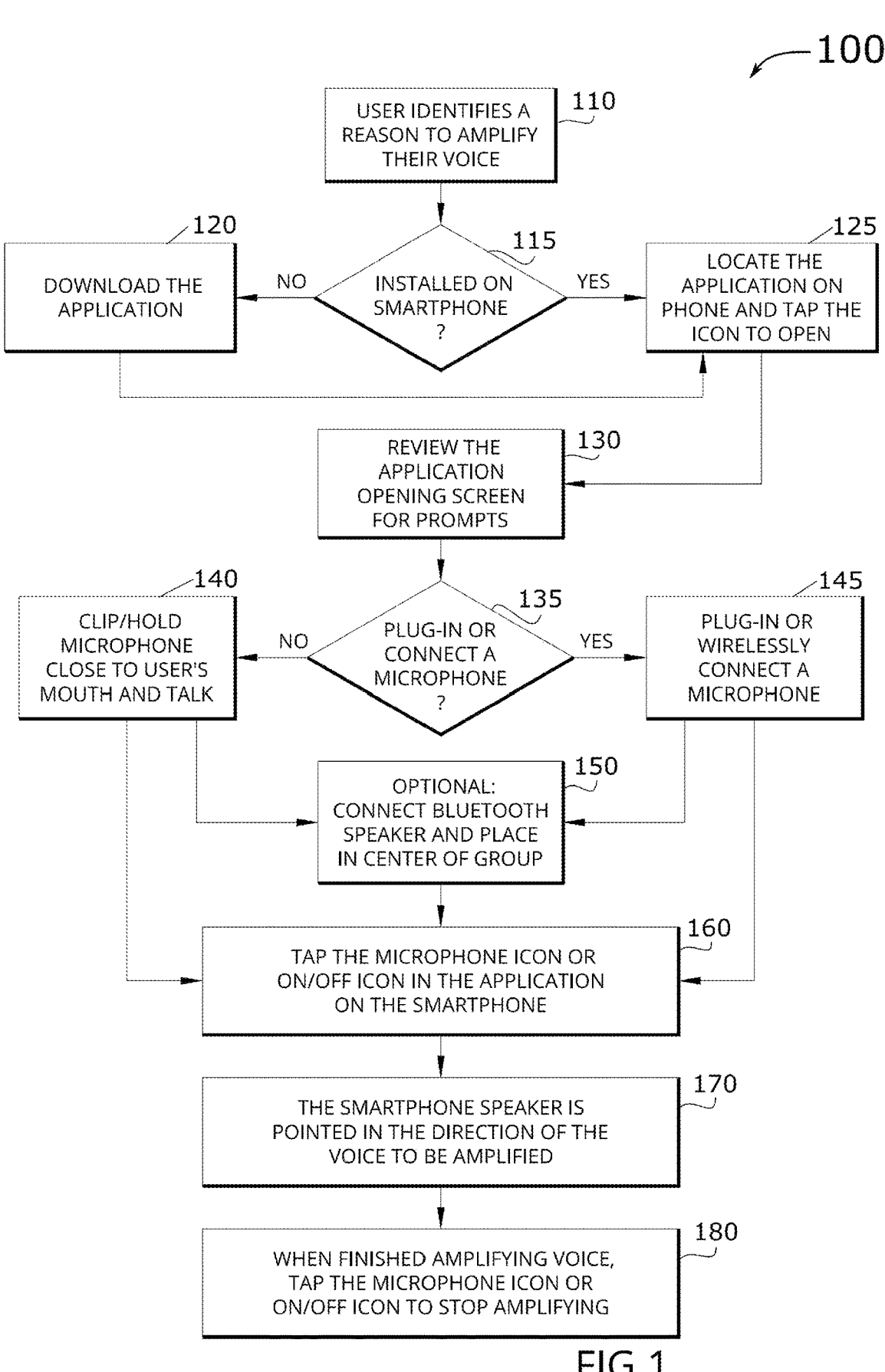
FIG. 1 conceptually illustrates a mobile device voice amplification method for amplifying volume of a voice is performed by a user operating the mobile device and interacting with the voice amplifier mobile app in some embodiments.

In the following detailed description of the invention, numerous details, examples, and embodiments of the invention are described. However, the invention is not limited to the embodiments set forth and the invention can be adapted for any of several applications.

Some embodiments provide (i) a voice amplifier that amplifies volume of a human voice from a microphone through a mobile device by utilizing a speaker that is communicably connected to the mobile device and (ii) a mobile device voice amplification method for amplifying volume of a voice. In some embodiments, the voice amplifier is implemented as a voice amplifier mobile app that runs on a mobile device, such as a smart phone, to purely amplify a voice of a user from a microphone. In some embodiments, the mobile device includes a mobile operating system ("OS" or "mobile device OS"). In some embodiments, the mobile device OS comprises one of Android and iOS operating systems.

In some embodiments, the mobile device voice amplification method for amplifying volume of a voice is performed by a user operating the mobile device and interacting with the voice amplifier mobile app.

In some embodiments, the voice amplifier amplifies the voice of the user from the microphone through the mobile device OS and then utilizes a speaker of the smartphone, a Bluetooth speaker, or a wired speaker to amplify the user's voice. In this way, the voice amplifier mobile app enables any user of a smartphone to amplify their own voice.

In some embodiments, the voice amplifier mobile app amplifies voices of users wearing items that block or partially block the user's mouth, including, without limitation, fabric masks, medical marks, and face shields. In this way, the voice amplifier mobile app is suited for use during times of pandemics, such as the COVID-19 pandemic and potential future viral pandemics, as well as for routine use by medical practitioners or others who routinely wear masks and need to communicate with others. Since masks, face shields, etc., muffle voices, the voice amplifier mobile app provides a universal technological solution to amplify voice volume of a user since all that is needed in a technical respect is a smartphone with internal speaker. As such, users can continue to wear their masks or face shields for safety reasons without muffling their voices and without sacrificing clear communication with others.

Embodiments of the voice amplifier described in this specification solve the problems described above by the voice amplifier mobile app which works in connection with a mobile device to amplify the user's voice in face to face and close environments safely. A huge proportion of the population have access to smartphones, making the voice amplifier mobile app an ideal option when a user merely uses the microphone of the smartphone to enable the user to simply and effectively amplify their voice. This option is universal because the voice amplifier mobile app does not change the functionality of the smartphone. By amplifying their voice, the user can be heard clearly and effectively and are able to communicate with others without having to remove their masks and therefore reducing the risk of spreading the COVID-19 virus. While the microphone is a small device that clips easily inside any type of mask and can either plug straight into a smart phone or be connected to the smartphone via Bluetooth, smartphones available in the current market support both wired and wireless microphone connections. Furthermore, microphones are available for purchase via a variety of retail and online outlets. The voice amplifier mobile app can also be utilized with a Bluetooth speaker in classrooms and rooms with groups of people so that the speakers voice can be amplified in larger spaces. The voice amplifier mobile app does not need to be used with a mask or face shield. Users may want to amplify their voices in different social scenarios. In addition, the voice amplifier mobile app has a variety of uses outside the use of a pandemic. For instance, some embodiments of the voice amplifier mobile app support instant translation of the spoken word to other languages and translation to a visual option for American Sign Language.

Embodiments of the voice amplifier and voice amplifier mobile app described in this specification differ from and improve upon currently existing options. In particular, the voice amplifier and voice amplifier mobile app purely amplify the user's voice and turn the user's smartphone into a veritable megaphone. Other existing apps either cannot amplify through the phone speaker or only have recording aspects as part of their solution which hinders conversation further as the user would have to record and then play back their words. As such, there is no other smartphone application that purely amplifies voice of a user.

In addition, there are other mask options that are designed and have a voice amplifier fully built in. The user wears the mask and can only be heard through the masks built in speaker and microphone. These masks also have their own power supply. Typically, these types of masks are designed for industry and for individuals that are entering a hazardous environment and not for the average person to be wearing daily due to viruses. These industrial masks are extremely expensive, and typically cover the entire head. Medical masks that help people who have issues with respiration and need air purified to breath also do not compare as they are designed to mediate issues and symptoms that patients are having. They are expensive and are not for everyday use for the average person with no medical issues. Also, some other devices are typically used by speakers at different events (e.g., an orator set up). With the use of a microphone, an electronic assembly/box that powers the system that starts in size from 3"×3"×2", and a separate speaker, an orator can amplify their voice to a class or group of people. By contrast, the voice amplifier and voice amplifier mobile app eliminates the need for the user to buy this set up and they can quite simply use their smartphone and the voice amplifier mobile app to amplify their voice. As such, the voice amplifier and voice amplifier mobile app can be used at all times when the user is not at home and needs to communicate safely with others while wearing a mask or a face shield. In addition, the voice amplifier and voice amplifier mobile app is designed to simply amplify a user's voice instantly while in a conversation with just one touch of an icon on the user's mobile device. Notably, recording of those conversations is redundant and not needed by the voice amplifier and voice amplifier mobile app. Instead, the voice amplifier provides a single functional aspect for enhancing clear communication by volume in realtime (or in some cases by realtime translation to another language and/or by output of visual signs for deaf). Also, the voice amplifier mobile app takes up very little space on the user's device. Too many features in other applications cause the memory of the mobile device to be used inefficiently and to waste space on the phones hard drive with recordings. Also, other mask options with built in voice amplifiers are extremely expensive and designed for use in an industrial or hazardous environment. By contrast, the voice amplifier and voice amplifier mobile app are essentially "plug and play", user friendly, cost effective, and operational just by selecting a single icon or button in the UI to amplify the user's voice.

The voice amplifier may be comprised of the following elements:
1. Mobile device (e.g., smartphone) with internal or external speaker
2. Voice amplifier mobile app
3. Microphone
4. Mask (face shield, scarf, etc.)

The elements of the voice amplifier may be related in the following exemplary fashion. A user has a smartphone and a microphone plugged in or connected wirelessly via Bluetooth settings. While wearing a mask, the user clips the microphone inside the mask. The user activates the SD2 application and taps the "microphone button". They simply speak and their voice is amplified out of the default speaker (phone speaker, wired/wireless speaker). The voice amplifier generally works by a mobile device and internal or connected speaker to amplify voice and via a voice amplifier mobile app through which the user may select the amplify button (or microphone button) in the voice amplifier mobile app and then start speaking.

By way of example, FIG. 1 conceptually illustrates a mobile device voice amplification method for amplifying volume of a voice 100. In some embodiments, the mobile device voice amplification method for amplifying volume of a voice 100 is performed by a user operating the mobile device and interacting with the voice amplifier mobile app.

In some embodiments, the mobile device voice amplification method for amplifying volume of a voice 100 starts upon the user identifying a reason to amplify their voice (at 110). For example, the user is wearing a mask, a face shield, a scarf, or some other cover that partially or completely blocks their mouth such that vocalizing in a clear audible manner that is capable of being heard by others is problematic or diminished. When the reason to amplify their voice is evident, the user simply determines whether the voice amplifier mobile app is installed on the mobile device (e.g., smartphone) which the user is presently operating (at 115).

When the voice amplifier mobile app is not installed on the device ('NO'), the mobile device voice amplification method for amplifying volume of a voice 100 proceeds to a step at which the user downloads the voice amplifier mobile app (at 120). The user can operate the mobile device to access a mobile app repository (such as the mobile app stores). Then, from the mobile app repository, the user would select the voice amplifier mobile app to download and install. While searching for the voice amplifier mobile app, the user may seek mobile apps by different names, such as "SD2 Voice Amplifier mobile app" or other names. It is noted also that the name of the voice amplifier mobile app has no limiting or constraining effect on the functionality provided by the voice amplifier mobile app described in this specification. In any event, after downloading and installing the voice amplifier mobile app on the mobile device, the mobile device voice amplification method for amplifying volume of a voice 100 moves forward to the next step at which the user locates, in a user interface (UI) of the voice amplifier mobile app that is displayed on a screen of the mobile device, an icon or other selectable indicator of the newly downloaded and installed voice amplifier mobile app, and then taps or selects the icon to launch the voice amplifier mobile app (at 125).

Turning back to the determination (at 115), when the voice amplifier mobile app is already installed on the device ('YES'), then mobile device voice amplification method for amplifying volume of a voice 100 proceeds straight away to the next step (at 125) during which the user locates the voice amplifier mobile app and selects the icon or other indicator in the UI of the voice amplifier mobile app as displayed on the screen of the mobile device.

After the voice amplifier mobile app is launched, the mobile device voice amplification method for amplifying volume of a voice 100 continues to move forward to the next step at which the user reviews an opening view (or 'screen') of the UI for the voice amplifier mobile app for prompts (at 130). In some embodiments, the voice amplifier mobile app automatically displays one or more prompts instructing the user what needs to be done before using the voice amplifier mobile app. For instance, the user may need to connect a microphone to effectively use the voice amplifier mobile app. Thus, the mobile device voice amplification method for amplifying volume of a voice 100 determines (at 135) whether a microphone needs to be plugged into the mobile device or otherwise connected to the mobile device.

When a microphone is already connected to the mobile device, the mobile device voice amplification method for amplifying volume of a voice 100 determines that there is no need to prompt the user to plug in a microphone ('NO') and instead triggers the voice amplifier mobile app to prompt the user to clip or hold the microphone close to the user's mouth to begin talking (at 140). On the other hand, when there is no microphone plugged into the mobile device, the mobile device voice amplification method for amplifying volume of a voice 100 causes the voice amplifier mobile app to prompt the user to plug in or wirelessly connect a microphone to the mobile device (at 145).

In some embodiments, the voice amplifier mobile app provides support for a wireless speaker that can be placed in the center of a group or room (also referred to as a "group speaker"). For example, a conference speaker is a common type of group speaker. Under that option, the mobile device voice amplification method for amplifying volume of a voice 100 provides a step whereby the user connects to the group speaker wirelessly (at 150), such as by making a Bluetooth or WiFi connection between the mobile device and the group speaker for placement in the center of the group or in some other centralized location for multiple users.

Whether the user already had a microphone or group speaker connected to the mobile device or had to plug in or wirelessly connect a microphone or group speaker, the mobile device voice amplification method for amplifying volume of a voice 100 proceeds to the next step at which the user activates the amplifier (at 160). In some embodiments, the user activates the amplifier (at 160) by tapping or selecting a microphone icon in the UI of the voice amplifier mobile app running on the mobile device. In some embodiments, the user activates the amplifier (at 160) by tapping or selecting an on/off icon in the UI of the voice amplifier mobile app running on the mobile device.

Next, the mobile device voice amplification method for amplifying volume of a voice 100 moves ahead to the next step at which the microphone of the mobile device is pointed in the direction to the voice to be amplified (at 170), which may be the voice of the user operating the mobile device or the voice of another user. The speaker then vocalizes their speaking points as normal. The voice amplifier mobile app automatically amplifies the voice so that others can hear the voice of the speaker. When finished amplifying the speaker's voice, the mobile device voice amplification method for amplifying volume of a voice 100 proceeds to the next step at which the user taps or selects the microphone icon or on/off icon in the UI of the voice amplifier mobile app to stop the amplifier.

Figure 2:
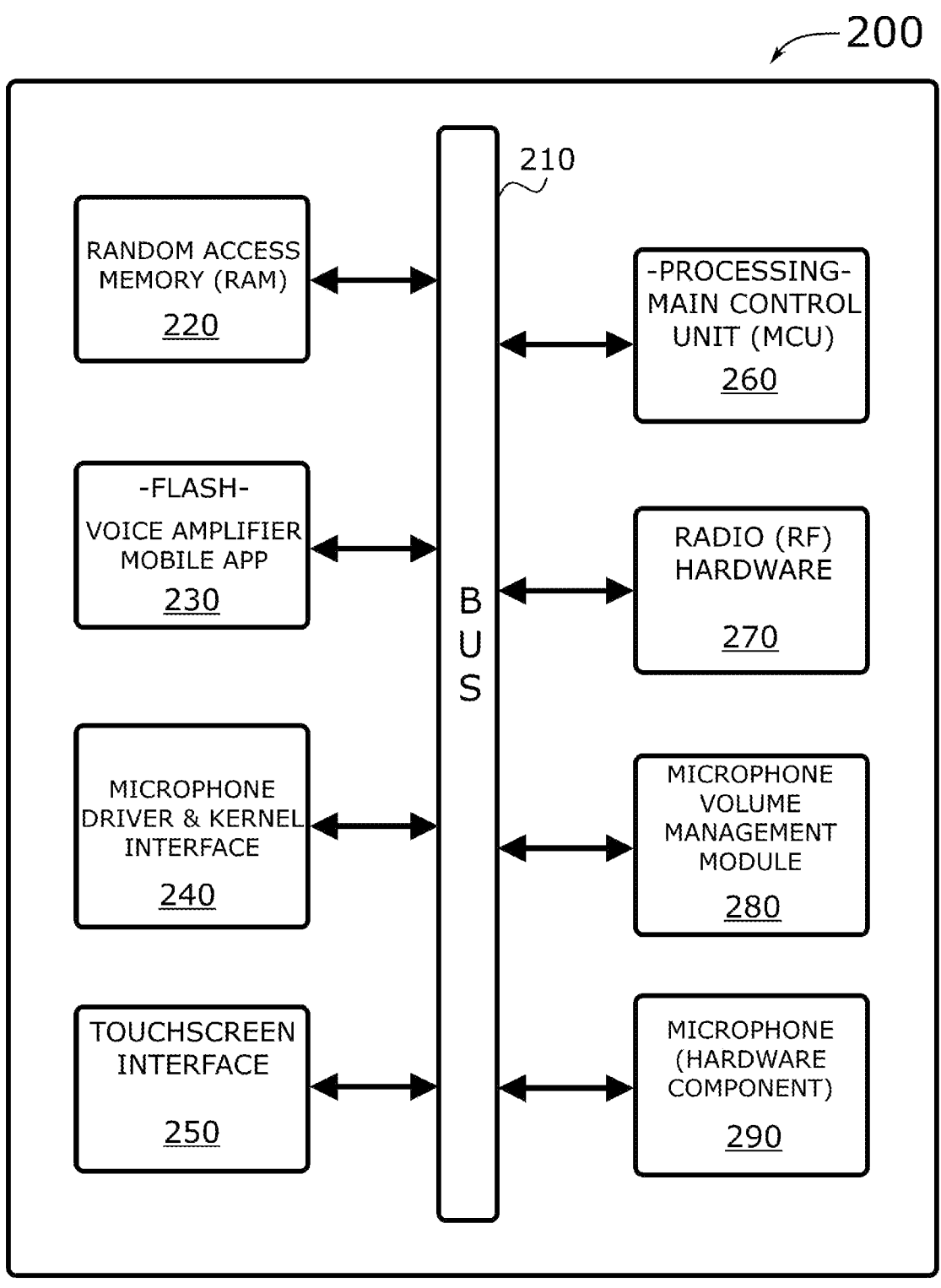
FIG. 2 conceptually illustrates electronic components of a mobile device that runs the voice amplifier mobile app in some embodiments.

Now, referring to another illustration, FIG. 2 shows a hardware layer with electronic components of a mobile device 200 that runs the voice amplifier mobile app. In this example, the mobile device 200 is the mobile device noted above by reference to FIG. 1, or any other mobile device, such as a tablet computing device, a smartphone, a group speaker with a processing unit, memory, storage, and other computing device hardware that supports operation of the voice amplifier mobile app and is configured to display the UI or provide an alternative mechanism of interaction (such as a voice activated system, etc.). Specifically, the schematic view of the mobile device 200 comprises a bus 210, a random access memory (RAM) 220, a flash memory with the voice amplifier mobile app 230, a microphone driver & kernel interface unit 240, a touchscreen interface 250, a mobile device processor as a main control unit (MCU) 260, radio (RF) hardware 270 including a wireless communication transceiver to connect a wireless group speaker or other wireless external speaker, a microphone volume management module 280, and a microphone 290 hardware component embedded in the mobile device 200.

In some embodiments, the UI of the voice amplifier mobile app 230 is visually output onto the touchscreen interface 250 when a user operating the mobile device 200 launches the voice amplifier mobile app 230. Once launched by the user, the voice amplifier mobile app 230 is accessed from the flash memory with the voice amplifier mobile app 230 (assuming installation of the voice amplifier mobile app 230 is already completed) and loaded into RAM 220. From RAM 220, the voice amplifier mobile app 230 is processed by the MCU 260, which is configured to execute (byte-code or machine language) instructions of the voice amplifier mobile app 230 retrieved from the RAM 220.

The mobile device 200 shown in this figure also includes radio (RF) hardware 270 with the wireless communication transceiver. The wireless communication transceiver of the RF hardware 270 may be a Bluetooth wireless communications module, a WiFi wireless communications module, another type of wireless communications module (e.g., Zigbee, etc.), or a combination of wireless modules on a single integrated wireless communications chip.

The mobile device 200 shown in this figure also includes the microphone volume management module 280 which is configured to automatically amplify a voice sound wave captured by the microphone 290 hardware component embedded in the mobile device 200 and output an amplification of the voice sound wave. The volume management module 280 also accesses the voice sound wave as directly captured by way of the microphone driver & kernel interface 240 of the mobile device 200. In this way, the voice amplifier mobile app 230, working in connection with the microphone volume management module 280, can amplify the voice of the user in realtime as the user is speaking. Any delay between initial capture of the voice of the user and output of the amplified voice of the user is undetectable to human hearing.

Finally, all of the hardware components of the mobile device 200 are communicably connected by way of the bus 210. The bus 210 collectively represents all mobile device, peripheral device, and chipset buses that communicatively connect the numerous internal devices of the mobile device 200. For instance, the bus 200 communicatively connects the MCU 260 with the RAM 220, the RAM 220 with the flash memory unit with the voice amplifier mobile app 230, the touchscreen display 250 with the RAM 220 and the MCU 260, the RF hardware 270 connecting an external speaker with the microphone driver & kernel interface 240, the microphone volume management module 280, and the hardware microphone 290, etc.

Overall, the voice amplifier mobile app enables users to amplify their voices for a variety of reasons and in several different contexts.

In some embodiments, the voice amplifier mobile app amplifies muffled mask voices of users wearing items that block or partially block the user's mouth, including, without limitation, fabric masks, medical marks, and face shields. In some embodiments, the voice amplifier mobile app amplifies muffled mask voices when a small microphone is inserted inside or clipped nearby the item blocking the user's mouth.

In some embodiments, the voice amplifier mobile app amplifies event speaker voices of users in business meetings or at events in which a speaker is going to speak to a relatively large group of people. In some embodiments, the voice amplifier mobile app amplifies event speaker voices of users by linking a wireless speaker (e.g., a Bluetooth speaker) to the event speaker's mobile device and placing the speaker at a location that can be heard by the people in the group furthest away from the event speaker. Examples of business meetings and events at which amplification of event speaker voices may be useful include, without limitation, stock/shareholder meetings, trade shows, weddings, christenings, town meetings, and other events at which people often speak spontaneously and, therefore, are not expected to approach any existing amplification set up that may have been set up prior to the event for planned speakers. Such people only need to insert a microphone or microphone adapter into their mobile device, clip the microphone to their lapel or otherwise near their mouth, open the voice amplifier mobile app, tap on the button to start amplification, and speak into the microphone.

In some embodiments, the voice amplifier mobile app amplifies medical procedure-related diminished vocal sound intensity voices of patients with lower or softer voices resulting from any form of medical procedure. Such patients only need to plug in a microphone or microphone adapter into their mobile device, clip or place the mic nearby their mouth, open the voice amplifier mobile app, select the amplification button in the mobile app, and start talking into the microphone to amplify their voice without straining their vocal cords or the area where surgery has been completed.

In some embodiments, the voice amplifier mobile app amplifies soft or low voices of users who have naturally soft or low voices. Such users can be confident that they are being heard by others, whether speaking to small or large groups, merely by opening the voice amplifier mobile app on their mobile device with microphone connected, tapping on the button to start amplification, and speaking into the microphone.

The above-described embodiments of the invention are presented for purposes of illustration and not of limitation.

I claim:

1. A voice amplification system comprising:
   a mobile device comprising a speaker, a microphone, random access memory (RAM), a flash memory, a processing main control unit (MCU), radio-frequency (RF) hardware, and a microphone volume management module;
   a voice amplifier mobile app that is stored in the flash memory of the mobile device and is executable by the MCU, wherein the voice amplifier mobile app, when executed by the MCU, is configured to:
   receive, via the microphone of the mobile device or an external microphone coupled to the mobile device, voice sound waves generated by a user;
   amplify the received voice sound waves in real-time with an undetectable delay; and
   output the amplified voice sound waves through at least the speaker of the mobile device, wherein the RF hardware is configured to wirelessly couple the mobile device to an external speaker for output of the amplified voice sound waves.

2. The voice amplification system of claim 1, wherein the mobile device comprises a smartphone.

3. The voice amplification system of claim 1, wherein the mobile device comprises a tablet computing device.

4. The voice amplification system of claim 1, wherein the connected speaker comprises an internal speaker embedded in the mobile device.

5. The voice amplification system of claim 1, wherein the microphone comprises an internal microphone embedded in the mobile device.

6. The voice amplification system of claim 1, wherein the external speaker wirelessly coupled to the mobile device comprises an external speaker wirelessly connected to the mobile device.

7. The voice amplification system of claim 6, wherein the external speaker wirelessly connected to the mobile device comprises a group speaker.

8. The voice amplification system of claim 1, wherein the external microphone coupled to the mobile device comprises an external microphone wirelessly connected to the mobile device.

9. A mobile device voice amplification method for amplifying voice sound waves, the method comprising:
   displaying, on a touchscreen interface of a mobile device, an opening screen of a voice amplifier mobile app providing prompts for amplification setup;
   determining whether an external microphone is connected to the mobile device;
   prompting, when the external microphone is not connected, a user to connect an external microphone by a wired connection or a wireless connection;
   receiving, via the external microphone or via an internal microphone of the mobile device, voice sound waves generated by the user;
   receiving user input selecting a microphone icon or an on/off icon within the voice amplifier mobile app to initiate amplification;
   amplifying the voice sound waves in real-time with an undetectable delay;
   outputting the amplified voice sound waves through a speaker of the mobile device or through an external speaker wirelessly coupled to the mobile device;
   orienting the mobile device such that the speaker is directed toward a listener; and
   receiving, when finished amplifying the voice sound waves, a user input selection of the microphone icon or the on/off icon to stop the amplification of the voice sound waves.

10. The mobile device voice amplification method of claim 9, wherein displaying the opening screen view of the voice amplifier mobile app comprises prompting the user to perform a prerequisite action.

11. The mobile device voice amplification method of claim 10, wherein the prerequisite action comprises moving the external microphone close to a mouth of the user and instructing the user to start talking into the external microphone.

12. The mobile device voice amplification method of claim 10, wherein the prerequisite action comprises prompting the user to connect the external microphone by one of plugging in a hard wired microphone into the mobile device and wirelessly connecting a wireless microphone to the mobile device.

13. The mobile device voice amplification method of claim 9, wherein outputting the amplified voice sound waves comprises outputting the amplified voice sound waves in real-time through an external speaker.

14. The mobile device voice amplification method of claim 13, wherein the external speaker comprises a group speaker.

15. The mobile device voice amplification method of claim 9, wherein outputting the amplified voice sound waves comprises outputting the amplified voice sound waves in real-time through an internal speaker embedded in the mobile device.

\* \* \* \* \*